United States Patent
Ding et al.

(10) Patent No.: US 11,507,340 B2
(45) Date of Patent: *Nov. 22, 2022

(54) AUDIO OUTPUT METHOD, ELECTRONIC DEVICE, AND STORAGE MEDIUM

(71) Applicant: Honor Device Co., Ltd., Guangdong (CN)

(72) Inventors: Ning Ding, Nanjing (CN); Chong Zhang, Shenzhen (CN); Zhen Liu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 13 days.

This patent is subject to a terminal disclaimer.

(21) Appl. No.: 17/189,458

(22) Filed: Mar. 2, 2021

(65) Prior Publication Data

US 2021/0182016 A1    Jun. 17, 2021

Related U.S. Application Data

(63) Continuation of application No. 16/750,627, filed on Jan. 23, 2020, now Pat. No. 10,963,214, which is a continuation of application No. 16/328,511, filed as application No. PCT/CN2016/097013 on Aug. 26, 2016, now Pat. No. 10,620,908.

(51) Int. Cl.
  *G06F 3/16* (2006.01)
  *H04R 29/00* (2006.01)
  *H04M 1/725* (2021.01)

(52) U.S. Cl.
  CPC .......... *G06F 3/165* (2013.01); *H04R 29/001* (2013.01); *H04M 1/725* (2013.01); *H04R 2420/03* (2013.01); *H04R 2420/05* (2013.01)

(58) Field of Classification Search
  CPC ... G06F 3/165; H04R 29/001; H04R 2420/05; H04M 1/725
  See application file for complete search history.

(56) References Cited

U.S. PATENT DOCUMENTS

| 5,729,604 A | 3/1998 | Van Schyndel |
| 8,195,220 B2 | 6/2012 | Kim et al. |
| 8,706,162 B1 | 4/2014 | Abrahamsson et al. |

(Continued)

FOREIGN PATENT DOCUMENTS

| CN | 1921665 A | 2/2007 |
| CN | 101720550 A | 6/2010 |

(Continued)

*Primary Examiner* — Andrew L Sniezek
(74) *Attorney, Agent, or Firm* — Conley Rose, P.C.

(57) ABSTRACT

An audio output method applied to an electronic device having a proximity sensor, where the method includes obtaining proximity data of the proximity sensor when the electronic device is coupled to an audio output device and has an audio signal to output, outputting, by an earpiece of the electronic device, the audio signal when the proximity data meets a preset condition, determining a type of the audio output device, and selecting, based on the type of the audio output device, whether to output the audio signal using the audio output device. Hence, an earpiece is enabled to output an audio signal under a specific condition when an electronic device including a mobile phone is coupled to another audio output device, thereby improving user experience.

20 Claims, 4 Drawing Sheets

(56) References Cited

U.S. PATENT DOCUMENTS

| | | |
|---|---|---|
| 9,918,157 B2 | 3/2018 | Kamada et al. |
| 10,620,908 B2 | 4/2020 | Ding et al. |
| 10,963,214 B2 * | 3/2021 | Ding ................... H04M 1/6058 |
| 2003/0162560 A1 | 8/2003 | Kaneko |
| 2008/0212753 A1 | 9/2008 | Yoshizawa |
| 2009/0197615 A1 | 8/2009 | Kim et al. |
| 2011/0086626 A1 | 4/2011 | Kerr |
| 2011/0183629 A1 | 7/2011 | Walley |
| 2011/0223974 A1 | 9/2011 | Agevik et al. |
| 2011/0263241 A1 | 10/2011 | Duarte et al. |
| 2011/0319128 A1 | 12/2011 | Miwa |
| 2012/0053715 A1 | 3/2012 | McKillop et al. |
| 2013/0094659 A1 | 4/2013 | Liu |
| 2013/0279724 A1 | 10/2013 | Stafford et al. |
| 2014/0122090 A1 | 5/2014 | Park |
| 2014/0314247 A1 | 10/2014 | Zhang |
| 2015/0086055 A1 | 3/2015 | Kato |
| 2017/0295272 A1 | 10/2017 | Gan et al. |
| 2019/0306298 A1 | 10/2019 | Yoon et al. |

FOREIGN PATENT DOCUMENTS

| | | |
|---|---|---|
| CN | 101917514 A | 12/2010 |
| CN | 102611961 A | 7/2012 |
| CN | 102932536 A | 2/2013 |
| CN | 102981741 A | 3/2013 |
| CN | 103024193 A | 4/2013 |
| CN | 202873023 U | 4/2013 |
| CN | 103257873 A | 8/2013 |
| CN | 103259902 A | 8/2013 |
| CN | 103517177 A | 1/2014 |
| CN | 103634447 A | 3/2014 |
| CN | 104065827 A | 9/2014 |
| CN | 104509129 A | 4/2015 |
| CN | 104616676 A | 5/2015 |
| CN | 104717363 A | 6/2015 |
| CN | 101895799 B | 8/2015 |
| CN | 105187639 A | 12/2015 |
| CN | 105677288 A | 6/2016 |
| CN | 105812585 A | 7/2016 |
| CN | 106101427 A | 11/2016 |
| CN | 107438131 A | 12/2017 |
| EP | 2171989 A1 | 4/2010 |
| EP | 2775693 A1 | 9/2014 |
| EP | 3188460 A1 | 7/2017 |
| EP | 2849417 B1 | 8/2017 |
| EP | 2990943 B1 | 12/2019 |
| JP | 2003258944 A | 9/2003 |
| JP | 2008187221 A | 8/2008 |
| JP | 2013247620 A | 12/2013 |
| KR | 20060106299 A | 10/2006 |
| KR | 20090100194 A | 9/2009 |
| KR | 20140010845 A | 1/2014 |
| KR | 20140054960 A | 5/2014 |
| WO | 2009005563 A1 | 1/2009 |
| WO | 2014078986 A1 | 5/2014 |
| WO | 2014169609 A1 | 10/2014 |
| WO | 2016045088 A1 | 3/2016 |

* cited by examiner

AUDIO OUTPUT METHOD, ELECTRONIC DEVICE, AND STORAGE MEDIUM

CROSS-REFERENCE TO RELATED APPLICATION

This application is a continuation of U.S. patent application Ser. No. 16/750,627, filed on Jan. 23, 2020, which is a continuation of U.S. patent application Ser. No. 16/328,511, filed on Feb. 26, 2019, now U.S. Pat. No. 10,620,908. The U.S. patent application Ser. No. 16/328,511 is a National Stage of International Patent Application No. PCT/CN2016/097013 filed on Aug. 26, 2016. All of the aforementioned applications are hereby incorporated by reference in their entireties.

TECHNICAL FIELD

Embodiments of the present disclosure relate to the terminal field, and in particular, to an audio output method, an electronic device, and a storage medium.

BACKGROUND

Currently, in addition to a built-in earpiece, a mobile phone may also be connected to another audio output device such as a wired earphone, a Bluetooth earphone, and a loudspeaker stereo.

In the prior art, when a mobile phone receives user-entered indication information indicating that a new incoming call has been answered, the mobile phone first determines whether the mobile phone is currently connected to another audio output device different from an earpiece. If the mobile phone is connected to the another audio output device, the audio output device outputs a call voice signal; or if the mobile phone is not connected to the another audio output device, the earpiece of the mobile phone outputs a call voice signal.

It can be learned from the above that in the prior art, if it is determined that the mobile phone is connected to the another audio output device, the audio output device outputs the call voice signal, and the earpiece of the mobile phone does not output the call voice signal. When answering the call by using the earpiece of the mobile phone, a user hears no sound. In this case, the user may mistakenly consider that the call is abnormal, and hang up. Alternatively, a user first realizes that a wrong answering device is used to answer the call, and can hear a call sound normally only after changing the answering device, delivering undesired user experience.

SUMMARY

Embodiments of the present invention provide an audio output method, an electronic device, and a storage medium, to improve user experience when an electronic device including a mobile phone is connected to another audio output device.

According to a first aspect, an audio output method is provided, where the method is applied to an electronic device having a proximity sensor, and the method includes: obtaining proximity data of the proximity sensor when the electronic device is connected to an audio output device and has a to-be-output audio signal; outputting, by an earpiece of the electronic device, the audio signal when the proximity data meets a preset condition, and determining a type of the audio output device; and determining, based on the type of the audio output device, whether the audio output device outputs the audio signal.

It can be learned from the above that in this embodiment of the present invention, it can be determined, based on that the proximity data meets the preset condition, that a user places the electronic device (for example, a mobile phone) near an ear for answering, so that the user can also hear a sound from the earpiece when placing the electronic device near the ear for answering. In this way, user experience is improved when the electronic device is connected to another audio output device. In addition, there are two audio signal output ways based on the type of audio output device: Both the earpiece and the audio output device output the audio signal, and only the earpiece outputs the audio signal. Based on the type of audio output device, one of the two ways is selected to output the audio signal. This improves flexibility of outputting the audio signal.

In a possible implementation, the method further includes: outputting, by the electronic device, prompt information when the earpiece of the electronic device outputs the audio signal, where the prompt information is a text prompt or a sound prompt.

It can be learned from the above that in this embodiment of the present invention, after the electronic device is connected to the audio output device, the audio signal is usually output by only the audio output device instead of the earpiece, and therefore when the earpiece of the electronic device outputs the audio signal, the electronic device outputs the prompt information. This can improve user experience.

In a possible implementation, the determining, based on the type of the audio output device, whether the audio output device outputs the audio signal includes: outputting, by the audio output device, the audio signal when the audio output device is an earphone.

It can be learned from the above that in this embodiment of the present invention, when the type of the audio output device indicates that the audio output device is the earphone, that is, when the audio output device has no loudspeaking function, the audio signal is output by the earpiece and the earphone. In this way, when user behavior is inaccurately identified based on that the proximity data meets the preset condition, the user can still hear a sound from the earphone.

In a possible implementation, the determining, based on the type of the audio output device, whether the audio output device outputs the audio signal includes: skipping, by the audio output device, outputting the audio signal when the audio output device is a loudspeaking device.

It can be learned from the above that in this embodiment of the present invention, when the type of the audio output device indicates that the audio output device has a loudspeaking function, the audio signal is output by using only the earpiece. This can protect user privacy and prevent another person from hearing the audio signal.

In a possible implementation, the proximity data is a distance between the electronic device and an obstacle, and that the proximity data meets a preset condition includes: the distance between the electronic device and the obstacle is less than or equal to a preset distance.

It can be learned from the above that in this embodiment of the present invention, a manner of identifying user behavior is simple, easy to implement, and quick to determine, and is particularly suitable for a specific scenario in which the user places the mobile phone near the ear for answering.

In a possible implementation, duration in which the proximity data meets the preset condition is greater than a preset time length.

It can be learned from the above that in this embodiment of the present invention, that the proximity data meets the preset condition is determined by determining that the duration in which the proximity data meets the preset condition is greater than the preset time length. This improves accuracy of determining that the proximity data meets the preset condition. In a possible implementation, the proximity data represents a distance between the electronic device and an obstacle; the obtaining proximity data of the proximity sensor when the electronic device is connected to an audio output device and has a to-be-output audio signal includes: when the electronic device is connected to the audio output device and has the to-be-output audio signal, obtaining a plurality of pieces of proximity data of the proximity sensor within a preset time length; and that the proximity data meets a preset condition is specifically: At least one of the plurality of pieces of proximity data meets a first preset condition, and/or a time-based change trend of the plurality of pieces of proximity data meets a second preset condition.

That at least one of the plurality of pieces of proximity data meets a first preset condition may be specifically: At least one of the plurality of pieces of proximity data is less than or equal to a preset distance. That a time-based change trend of the plurality of pieces of proximity data meets a second preset condition may be specifically: The time-based change trend of the plurality of pieces of proximity data is a decreasing trend.

It can be learned from the above that in this embodiment of the present invention, whether the proximity data meets the preset condition is determined by obtaining the plurality of pieces of proximity data within the preset time length and considering the change trend of the plurality of pieces of proximity data, so as to determine user behavior. This manner can improve accuracy of a determining result.

In a possible implementation, the outputting, by an earpiece of the electronic device, the audio signal when the proximity data meets a preset condition includes: setting an audio type of the audio signal to a custom audio type when the proximity data meets the preset condition; and outputting, by the earpiece, the audio signal based on a preset correspondence between the custom audio type and the earpiece.

It can be learned from the above that for a common case in audio signal output after the electronic device is connected to the audio output device, to be specific, the audio signal is usually output by only the audio output device instead of the earpiece, in this embodiment of the present invention, the custom audio type is used and the correspondence between the custom audio type and the earpiece is preset, so that after the electronic device is connected to the audio output device, the earpiece of the electronic device outputs the audio signal when the proximity data meets the preset condition. This implementation is relatively clever and easy to implement.

According to another aspect, an electronic device is provided. The electronic device includes a processor, a memory, an earpiece, a proximity sensor, and an interface circuit. The memory is configured to store computer executable program code, the program code includes an instruction, and when the processor executes the instruction, the method of the first aspect is implemented. For an implementation and a beneficial effect of resolving a problem by the electronic device, refer to the first aspect, the possible implementations of the first aspect, and the beneficial effect thereof. Details are not described herein again.

According to still another aspect, an embodiment of the present invention provides an electronic device. The electronic device includes an obtaining unit and a processing unit; the obtaining unit is configured to obtain proximity data of a proximity sensor when the electronic device is connected to an audio output device and has a to-be-output audio signal; and the processing unit is configured to: determine that an earpiece of the electronic device outputs the audio signal when the proximity data obtained by the obtaining unit meets a preset condition, and determine a type of the audio output device, and determine, based on the type of the audio output device, whether the audio output device outputs the audio signal. Based on a same invention idea, for a principle and a beneficial effect of resolving a problem by the electronic device, refer to the first aspect, the possible implementations of the first aspect, and the beneficial effect thereof. Therefore, for implementation of the electronic device, refer to the implementation of the method. Details are not described herein again.

According to yet another aspect, an embodiment of the present invention provides a computer storage medium configured to store a computer software instruction used in a designed solution of the method of the first aspect.

Compared with the prior art, in the embodiments of the present invention, it can be determined, based on that the proximity data meets the preset condition, that the user places the electronic device near the ear for answering, so that the user can also hear a sound from the earpiece when placing the electronic device near the ear for answering. In this way, user experience is improved when the electronic device is connected to another audio output device. In addition, there are two audio signal output ways based on the type of audio output device: Both the earpiece and the audio output device output the audio signal, and only the earpiece outputs the audio signal. Based on the type of audio output device, one of the two ways is selected to output the audio signal. This improves flexibility of outputting the audio signal by the electronic device.

DESCRIPTION OF EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Figure 1:
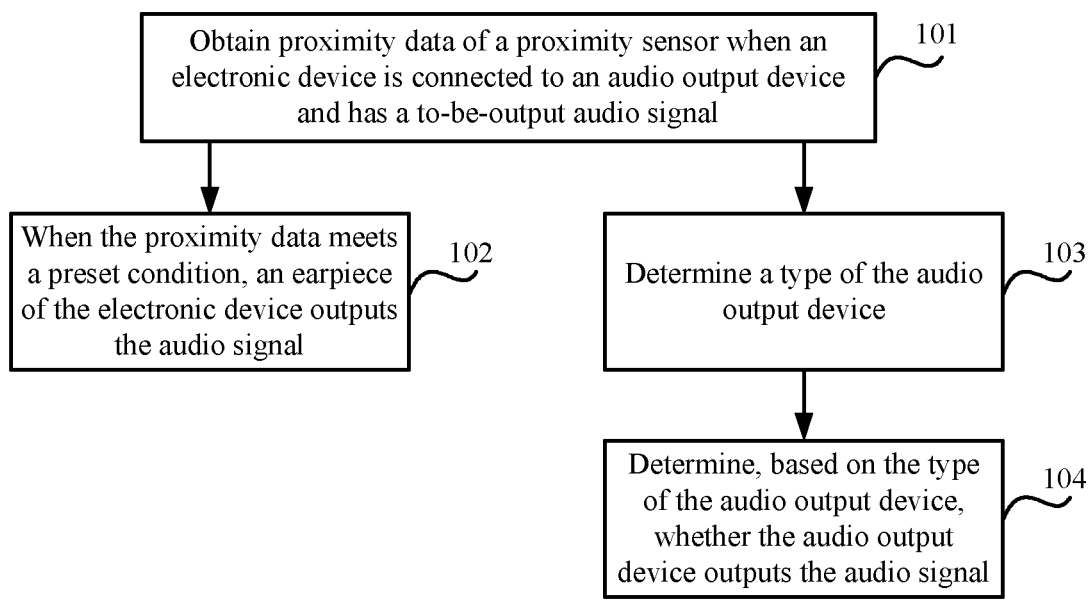
FIG. 1 is a flowchart of an audio output method according to an embodiment of the present invention.

FIG. 1 is a flowchart of an audio output method according to an embodiment of the present invention. The method may be performed by an electronic device having a proximity sensor, for example, a mobile phone. The method includes:

obtaining proximity data of the proximity sensor when the electronic device is connected to an audio output device and has a to-be-output audio signal; outputting, by an earpiece of the electronic device, the audio signal when the proximity data meets a preset condition, and determining a type of the audio output device; and determining, based on the type of the audio output device, whether the audio output device outputs the audio signal.

It should be understood that in this embodiment of the present invention, the electronic device may be referred to as a terminal, user equipment (User Equipment, "UE" for short), a mobile station (Mobile Station, "MS" for short), a mobile terminal (Mobile Terminal), a computer, a microcomputer, or the like. The electronic device may communicate with one or more core networks by using a radio access network (Radio Access Network, "RAN" for short). For example, the electronic device may be a mobile phone (or referred to as a "cellular" phone), a computer having a mobile terminal, or the like. For example, the electronic device may alternatively be a portable, pocket-sized, handheld, computer built-in, or in-vehicle mobile apparatus that exchanges voice and/or data with a radio access network. This is not limited in the present invention. For example, the electronic device alternatively includes a wired electronic device having a multi-carrier feature.

The following details an implementation solution of the method steps.

Step 101: Obtain proximity data of the proximity sensor when the electronic device is connected to an audio output device and has a to-be-output audio signal.

The audio output device may be a device that can output the audio signal, for example, an earphone or a stereo, and is different from the earpiece. The audio output device may be connected to the electronic device in a wired or wireless manner. The audio output device may be a Bluetooth device, a Wireless Fidelity (Wireless-Fidelity, wifi) device, or a device connected by using another connection interface.

The output audio signal may be triggered by an audio output event, and the audio output event may be an audio output event such as an incoming call voice, a ringtone, a Voice over Internet Protocol (Voice over Internet Protocol, voip) voice, text to speech (Text to Speech, TTS) broadcast, or music play.

The electronic device analyzes the proximity data to determine user behavior, for example, determining that a user places the electronic device near an ear, and modifies at least one setting of the electronic device in response to an analysis result, for example, how to process input or output data from an input/output device. The electronic device may be a telephone such as a cellular telephone, or an integrated telephone and media player, or another type of device that may include a sensor and process data from the sensor. In addition, the input/output device may be an audio input/output device, a keypad, or a multi-touch input pad. The sensor may be any one of various sensors including a proximity sensor, a temperature sensor, an accelerometer, a light sensor, a position determining device, an orientation determining device, a radio frequency electromagnetic wave sensor, a touch input pad, a motion sensor, or a sound sensor. In some embodiments, the electronic device may include a plurality of sensors that provide data to at least one processor together, and the processor analyzes the data to determine user behavior. In at least some embodiments, artificial intelligence processing may be used during analysis, and the processing includes comparing data obtained from one or more sensors with a threshold, for example, comparing data from the proximity sensor with the threshold. The threshold represents a distance between a part of the device and an ear or a head of the user. The data from the sensor may represent a simulated value detected by the sensor. The simulated value may indicate any one of various simulated values including, for example, a distance, a temperature, light intensity, a measurement of motion or orientation, a sound intensity measurement, or a radio frequency (Radio Frequency, RF) electromagnetic measurement. In at least some embodiments, artificial intelligence may be needed to process received data and select an interpretation of the data from a set of possible interpretations, and the selected interpretation is further used to determine how to modify the at least one setting. The modified setting may be any one of various settings including, for example, a setting of an illuminator of a display, a setting of a sound input or output parameter, a setting of a sound output device, a setting of a status of an input device related to user input reception, a setting of a communications parameter, a setting of a processor, or a setting of a device mode (for example, a cellular phone mode or a media player mode).

Step 102: When the proximity data meets a preset condition, an earpiece of the electronic device outputs the audio signal.

In an example, the proximity data may represent a distance between the electronic device and an obstacle.

When the proximity data meets the preset condition, that is, the distance between the electronic device and the obstacle is less than or equal to a preset distance, the earpiece of the electronic device outputs the audio signal.

In an example, when the earpiece of the electronic device outputs the audio signal, the electronic device outputs prompt information, and the prompt information is a text prompt or a sound prompt used to notify the user that the earpiece has output the audio signal.

In an example, when the proximity data does not meet the preset condition, that is, when the distance between the electronic device and the obstacle is greater than the preset distance, the audio signal is output by the audio output device instead of the earpiece of the electronic device.

In an example, the proximity data represents a distance between the electronic device and an obstacle. In step 101, when the electronic device is connected to an audio output device and has a to-be-output audio signal, a plurality of pieces of proximity data of the proximity sensor are obtained within a preset time. In step 102, that the proximity data meets a preset condition is specifically: At least one of the plurality of pieces of proximity data meets a first preset condition, and/or a time-based change trend of the plurality of pieces of proximity data meets a second preset condition, and duration in which the proximity data meets the preset condition is greater than a preset time.

The proximity data represents the distance between the electronic device and the obstacle, and that at least one of the plurality of pieces of proximity data meets a first preset condition means that the distance between the electronic device and the obstacles is less than or equal to a preset distance. That a time-based change trend of the plurality of pieces of proximity data meets a second preset condition may be specifically: The time-based change trend of the plurality of pieces of proximity data is a decreasing trend.

It can be learned from the above that in this embodiment of the present invention, that the proximity data meets the preset condition is determined by determining that the duration in which the proximity data meets the preset condition is greater than the preset time. This improves accuracy of determining that the proximity data meets the preset condition.

Step 103: Determine a type of the audio output device.

Specifically, the audio output device can be classified into two categories. One category is an audio output device having a loudspeaking function that is a loudspeaking device for short, for example, a loudspeaker stereo. The other category is an audio output device having no loudspeaking function, for example, an earphone.

In this embodiment of the present invention, no specific limitation is imposed on an execution order of step 102 and step 103. Step 102 may be performed before step 103, or step 103 may be performed before step 102, or step 102 and step 103 may be performed simultaneously.

Step 104: Determine, based on the type of the audio output device, whether the audio output device outputs the audio signal.

In an example, when the audio output device is an earphone, the audio output device outputs the audio signal.

In an example, when the audio output device is a loudspeaking device, the audio output device skips outputting the audio signal.

In this embodiment of the present invention, when the earpiece of the electronic device outputs the audio signal, the audio output device may or may not output the audio signal. In an example, it may be determined, based on the type of the audio output device, whether the audio output device outputs the audio signal. When the type of the audio output device indicates that the audio output device does not have a loudspeaking function (such as an earphone), the audio output device outputs the audio signal. This can prevent the user from hearing, when a wrong result is determined, no sound by using the audio output device. When the type of the audio output device indicates that the audio output device has a loudspeaking function (such as a stereo), the audio output device skips outputting the audio signal, to protect user privacy.

In an example, the following manner may be used to enable the earpiece of the electronic device to output the audio signal: when the proximity data meets the preset condition, setting an audio type of the audio signal to a custom audio type; and outputting, by the earpiece, the audio signal based on a preset correspondence between the custom audio type and the earpiece.

In an example, the following manner may be used to enable the earpiece and the audio output device of the electronic device to output the audio signal: when the proximity data meets the preset condition and the audio output device does not have a loudspeaking function, setting an audio type of the audio signal to a custom audio type; and outputting, by the earpiece and the audio output device, the audio signal based on a preset correspondence between the custom audio type and the earpiece and the audio output device.

In this embodiment of the present invention, it can be determined, based on that the proximity data meets the preset condition, that the user places the electronic device near an ear for answering, so that the user can also hear a sound from the earpiece when placing the electronic device near the ear for answering. In this way, user experience is improved when the electronic device is connected to another audio output device. In addition, there are two audio signal output ways based on the type of audio output device: Both the earpiece and the audio output device output the audio signal, and only the earpiece outputs the audio signal. Based on the type of audio output device, one of the two ways is selected to output the audio signal. This improves flexibility of outputting the audio signal by the electronic device.

The following specifically describes, by using an example of an application scenario in which a user answers a call by using a mobile phone, an audio output method provided in the present invention.

Figure 2:
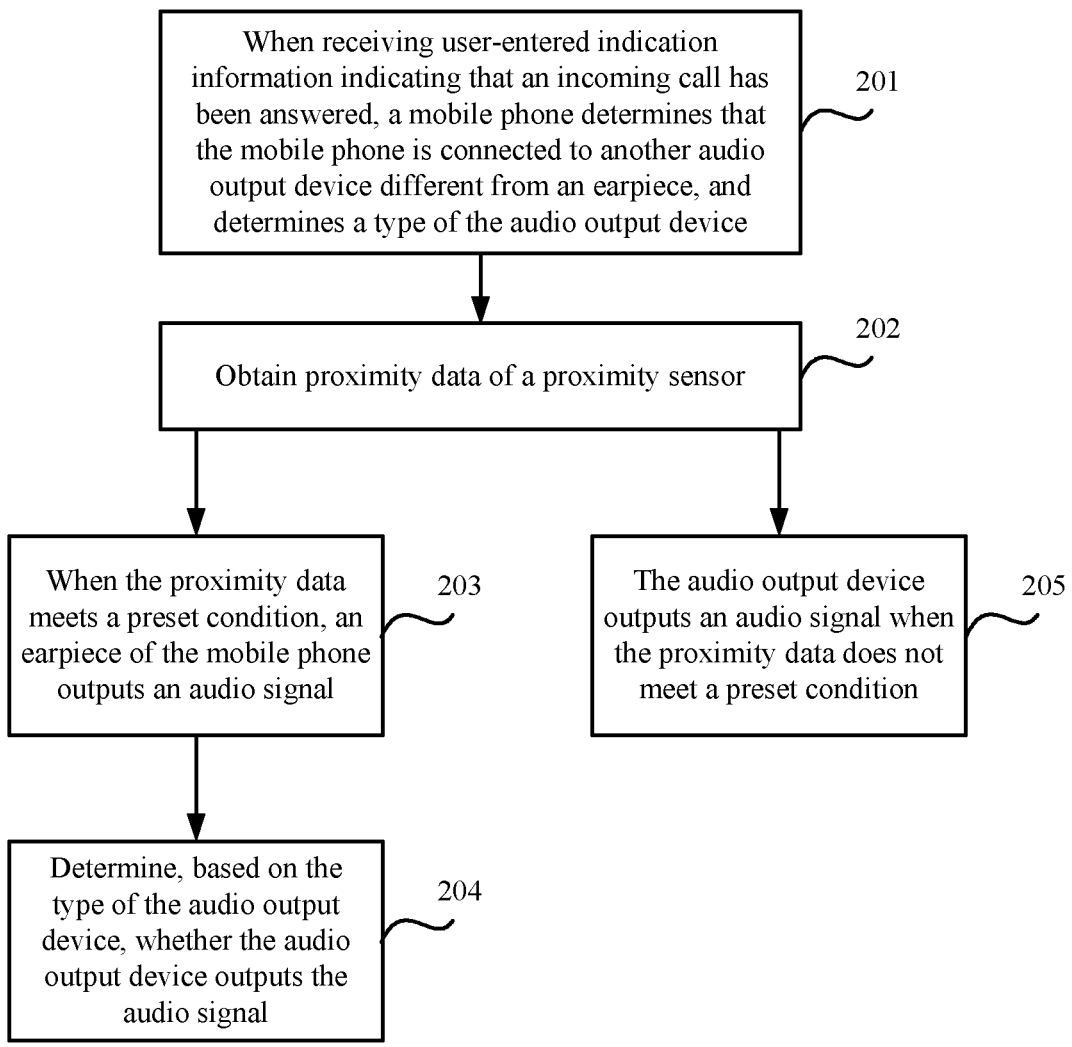
FIG. 2 is a flowchart of another audio output method according to an embodiment of the present invention.

FIG. 2 is a flowchart of another audio output method according to an embodiment of the present invention. The method is performed by a mobile phone having a proximity sensor.

The method includes the following steps.

Step 201: When receiving user-entered indication information indicating that an incoming call has been answered, the mobile phone determines that the mobile phone is connected to another audio output device different from an earpiece, and determines a type of the audio output device.

The mobile phone may detect not only another audio output device connected in a wired manner that is different from the earpiece, but also another audio output device connected in a wireless manner that is different from the earpiece.

The audio signal includes an incoming call ringtone signal and/or a call voice signal.

The electronic device dynamically updates an audio policy table based on the audio signal and the connected another audio output device. The audio policy table includes a correspondence between the audio signal and an audio output device that is to output the audio signal.

For example, when there is an incoming call ringtone, the electronic device configures, by querying the audio policy table, an audio output device corresponding to the incoming call ringtone.

Step 202: Obtain proximity data of a proximity sensor.

In this embodiment of the present invention, the proximity sensor may be specifically a distance sensor, and the proximity data may represent a distance between the mobile phone and an obstacle. An implementation method of obtaining the proximity data is the same as the implementation method of obtaining the proximity data in step 101.

Step 203: When the proximity data meets a preset condition, an earpiece of the mobile phone outputs an audio signal.

In this embodiment of the present invention, whether the earpiece of the electronic device outputs the audio signal is determined by determining whether the proximity data meets the preset condition, to be specific, whether a user places the mobile phone near an ear. When the proximity data meets the preset condition, to be specific, when the user places the mobile phone near the ear, the earpiece of the mobile phone outputs the audio signal.

In this embodiment of the present invention, whether to output the audio signal by using the earpiece of the mobile phone is determined by detecting the distance between the mobile phone and the obstacle. When the proximity data meets the preset condition, to be specific, when the distance between the mobile phone and the obstacle is less than or equal to an effective answering distance, it is determined that the user places the mobile phone near the ear, and the audio signal is output by the earpiece. When the proximity data does not meet the preset condition is met, to be specific, when the distance between the mobile phone and the obstacle is greater than the effective answering distance, it is determined that the user does not place the mobile phone near the ear, and the earpiece of the mobile phone skips outputting the audio signal.

That the proximity data meets the preset condition includes: Duration in which the proximity data meets the preset condition is greater than a preset time, to be specific, duration in which the user places the mobile phone near the ear is greater than the preset time. When the duration in which the user places the mobile phone near the ear is greater than the preset time, the earpiece of the mobile phone outputs the audio signal. This improves accuracy of a detection result. The preset time is, for example, 2 seconds.

Step 204: Determine, based on the type of the audio output device, whether the audio output device outputs the audio signal.

When the audio output device is an earphone having no loudspeaking function, the audio output device outputs the audio signal. When the audio output device is a device having a loudspeaking function, the audio output device skips outputting the audio signal.

In this embodiment of the present invention, when the mobile phone is connected to the another audio output device and receives indication information indicating that an incoming call has been answered, the mobile phone detects that the user places the mobile phone near the ear, and the user can hear a sound from the earpiece. In addition, whether the audio output device outputs the call voice signal may also be determined based on the type of the audio output device.

In an example, when the proximity data meets the preset condition, an audio type of the audio signal is set to a custom audio type; and an audio output device corresponding to the custom audio type outputs the audio signal based on a preset correspondence between the custom audio type and the earpiece. For example, a correspondence between an audio type and an audio output device may be shown in Table 1.

TABLE 1

| Audio type | Audio output device |
| --- | --- |
| Music | Loudspeaker |
| Call ringtone | Loudspeaker |
| Call voice | Earphone |
| Custom audio type 1 | Earpiece |
| Custom audio type 2 | Earpiece + earphone |

In this embodiment of the present invention, when the audio output device is an earphone having no loudspeaking function, the audio output device outputs the call voice signal, that is, both the earpiece and the earphone output the call voice signal. In this way, when a determining result that the user places the mobile phone near an ear is incorrect, the user can still hear a call voice by using the earphone. This improves user experience. When the audio output device is a device having a loudspeaking function, the audio output device skips outputting the call voice signal. In other words, only the earpiece outputs the call voice signal. This can prevent another person from hearing the call voice signal and protects user privacy.

In an example, the method further includes the following step:

Step 205: The audio output device outputs the audio signal when the proximity data does not meet the preset condition.

Step 205 may be implemented in a manner of presetting a correspondence between the audio type and the audio output device.

The following describes, by using a specific embodiment, a method for determining the type of audio output device provided in the present invention.

In an example, the following manner may be used to determine whether a device is inserted into the mobile phone in a wired manner:

using an isWiredHeadsetOn( ) method in AudioManager provided in an Android system, where the method returns true if a device is inserted into the mobile phone in a wired manner; otherwise, the method returns false.

Optionally, after it is determined that a wired device is inserted, whether the inserted device is a wired earphone or a wired stereo is determined based on an impedance characteristic.

In an example, the following manner may be used to determine whether there is an audio output device such as an earphone or a loudspeaker stereo connected to the mobile phone through Bluetooth:

obtaining a Bluetooth type of a Bluetooth device connected to the mobile phone, and when the Bluetooth type is any one type in an audio-output-device Bluetooth type list, determining that there is an audio output device connected to the mobile phone through Bluetooth.

The Android system itself specifies a series of Bluetooth types. Specifically, a BluetoothClass.Device class defines a series of Bluetooth types, including an earphone type, an in-vehicle device type, and the like. The mobile phone determines a Bluetooth type of a connected Bluetooth device (Bluetooth Device) based on a property of the Bluetooth device, and may find a corresponding type by comparing the Bluetooth type with the types specified in BluetoothClass.Device. The following shows types agreed upon by Bluetooth manufacturers:

int AUDIO_VIDEO_CAMCORDER
    int AUDIO_VIDEO_CAR_AUDIO
    int AUDIO_VIDEO_HANDSFREE
    int AUDIO_VIDEO_HEADPHONES
    int AUDIO_VIDEO_HIFI_AUDIO
    int AUDIO_VIDEO_LOUDSPEAKER
    int AUDIO_VIDEO_MICROPHONE
    When BluetoothDevice==AUDIO_VIDEO_CAR_AUDIO||AUDIO_VIDEO_HANDSFREE||AUDIO_VIDEO_HEADPHONES||AUDIO_AUDIO_HIFI_AUDIO||AUDIO_VIDEO_MICROPHONE, it is determined that the audio output device such as an earphone or a loudspeaker stereo is connected to the mobile phone through Bluetooth.

The following specifically describes, with reference to an audio output structure of a mobile phone operating system (Operating System, OS), an audio output method provided in an embodiment of the present invention.

Figure 3:
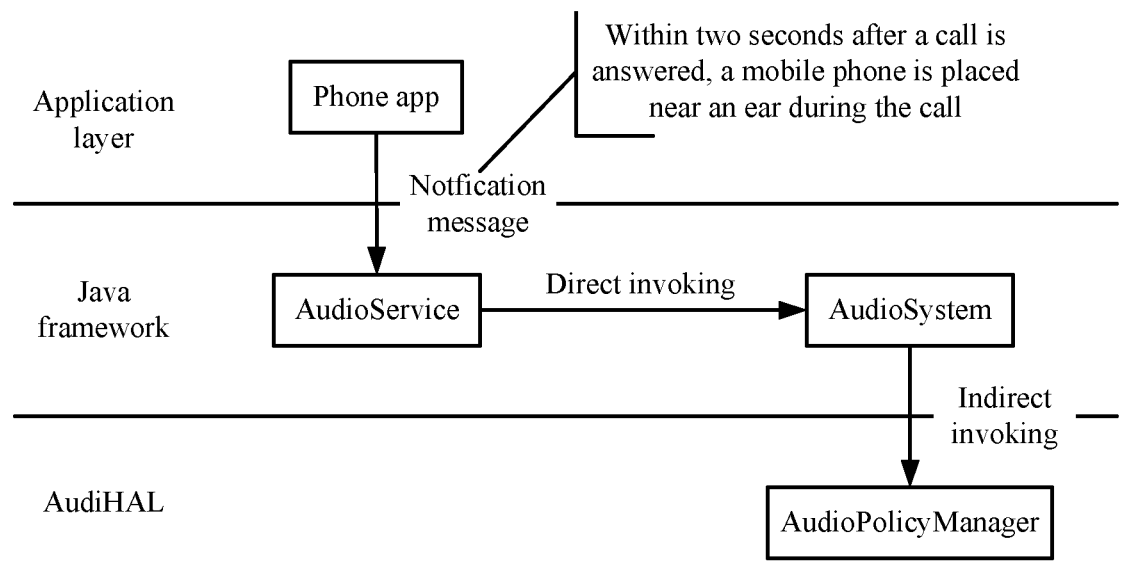
FIG. 3 is a schematic diagram of an audio output structure of a mobile phone operating system.

FIG. 3 is a schematic diagram of an audio output structure of a mobile phone OS. Referring to FIG. 3, audio output sequentially passes through three layers: an application layer, a Java framework, and AudiHAL.

Phone app is a phone application program at the application layer. The phone application program can alert the user to an incoming call, receive an indication message indicating that the user has answered the new incoming call, and send a notification message to AudioService in the Java framework when determining that the proximity data meets the preset condition, to be specific, the mobile phone is close to an ear. The notification message is used to indicate that the mobile phone is placed near the ear.

AudioService belongs to the Java framework layer and is a base for an audio system in the Android OS. Main functions of AudioService are volume control, volume key processing, and audio I/O device management. In this embodiment of the present invention, after receiving the notification message sent by Phone app, AudioService sends the notification message to AudioSystem.

AudioSystem belongs to the Java framework layer, acts as an entry point for obtaining an audio system resource, and allows querying and accessing a mixer installed on the system. AudioSystem includes many methods for changing audio data from one format to another, and methods for performing conversion between an audio file and a stream. After receiving the notification message sent by AudioService, AudioSystem sends the notification message to AudioPolicyManager at the AudiHAL layer.

The AudiHAL layer is a bottom audio layer of the Android system and is a logical layer for communication and control within a same audio device. An audio management strategy of the Android system is: The Android system sets different routes for different audio types, selects different output devices based on the routes, and the audio output device connected to the electronic device creates a correspondence based on the audio type and the audio output device connected to the electronic device. For example, when a type of audio sent by the application layer to AudioService is STREAM_MUSIC and the electronic device is connected to an earphone, it is determined, based on the audio policy table, a sound whose audio type is STREAM_MUSIC is output from the earphone. If a type of audio is STREAM_RING, the audio is simultaneously emitted from both the earphone and the loudspeaker (speaker).

Selecting corresponding output devices for different audio types based on the routes mainly depends on a getDeviceForStrategy method of AudioPolicyManager. Therefore, the audio management policy of the Android system can be customized by adding a custom audio type and modifying an audio policy of getDeviceForStrategy.

For example, an audio type STREAM_CALLING_NEW is newly added, and a corresponding audio output device configured for the audio type is as the earpiece and the earphone of the mobile phone.

When receiving the notification message transferred by an upper-layer application, AudioPolicyManager sets the audio type to STREAM_CALLING_NEW, and in getDeviceForStrategy method, the earpiece and the earphone of the mobile phone are selected as output devices based on a modified audio policy.

The audio output method provided in this embodiment of the present invention is simple and easy to implement, and improves user experience.

Figure 4:
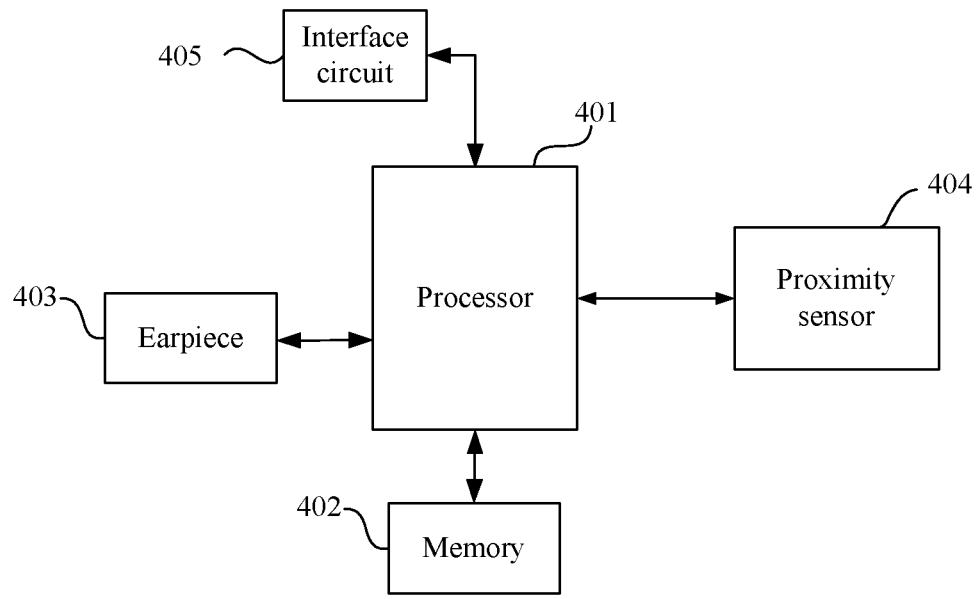
FIG. 4 is a structural diagram of an electronic device according to an embodiment of the present invention.

FIG. 4 is a structural diagram of an electronic device according to an embodiment of the present invention. The electronic device is configured to perform the audio output method provided in the embodiments of the present invention. The electronic device includes:

a processor 401, a memory 402, an earpiece 403, a proximity sensor 404, and an interface circuit 405.

The memory 402 is configured to store computer executable program code, and the program code includes an instruction.

The processor 401 invokes the instruction stored in the memory 402 to implement step 101 to step 104 in FIG. 1, step 201 to step 205 in FIG. 2, and the solution designed in the audio output method. For an implementation and a beneficial effect of resolving a problem by the electronic device, refer to the implementation and the beneficial effect of the foregoing method. Therefore, for implementation of the electronic device, refer to the implementation of the method. Details are not described herein again.

Figure 5:
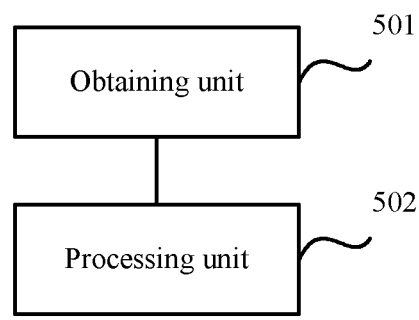
FIG. 5 is a structural diagram of another electronic device according to an embodiment of the present invention.

FIG. 5 is a structural diagram of another electronic device according to an embodiment of the present invention. The electronic device is configured to perform the audio output method provided in the embodiments of the present invention. The electronic device includes an obtaining unit 501 and a processing unit 502. The obtaining unit 501 is configured to implement step 101 in FIG. 1 and step 202 in FIG. 2. The processing unit 502 is configured to perform step 102 to step 104 in FIG. 1, step 201, and step 203 to step 205 in FIG. 2, and the audio output method. For an implementation and a beneficial effect of resolving a problem by the electronic device, refer to the implementation and the beneficial effect of the foregoing method. Therefore, for implementation of the electronic device, refer to the implementation of the method. Details are not described herein again.

A person skilled in the art may be further aware that the units and algorithm steps in the examples described in the embodiments disclosed in this specification may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use a different method to implement the described functions for each particular application, but it should not be considered that the implementation goes beyond the scope of the present invention.

In the several embodiments provided in this application, it should be understood that the disclosed electronic device and method may be implemented in other manners. For example, the embodiments described above are merely examples. For example, division of the units is merely logical function division, and may be other division in actual implementation. For example, a plurality of units or components may be combined or may be integrated into another apparatus, or some features may be ignored or may not be performed. In addition, the displayed or discussed mutual couplings or direct couplings or communication connections may be implemented through some interfaces. The indirect couplings or communication connections between electronic devices or units may be implemented in electrical, mechanical, or other forms.

The units described as separate parts may or may not be physically separate. Parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of hardware in addition to a software functional unit.

The integrated unit implemented in a form of a software functional unit may be stored in a non-volatile computer readable storage medium. The software functional unit is stored in a non-volatile storage medium and includes several instructions for instructing a computer device (which may be a personal computer, a server, a network device, or the like) to perform some of the steps of the methods described in the embodiments of the present invention. The foregoing storage medium includes any medium that can store program code, for example, a USB flash drive, a removable hard disk, a read-only memory (Read-Only Memory, ROM), a random access memory RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A system comprising:
   a Bluetooth earphone; and
   a mobile phone communicatively coupled to the Bluetooth earphone through a Bluetooth connection, wherein the mobile phone comprises:
   a processor;
   a proximity sensor coupled to the processor;
   a motion sensor coupled to the processor;
   an earpiece coupled to the processor; and
   a non-transitory computer-readable memory coupled to the processor, wherein the non-transitory computer-readable memory stores instructions that, when executed by the processor, cause the mobile phone to:
   output audio signal of a call to the Bluetooth earphone after the call is answered;
   switch audio signal of the call from being output to the Bluetooth earphone to being output to the earpiece based on information from the proximity sensor and the motion sensor when a user places the mobile phone near an ear of the user within a preset time after the call is answered; and
   continue to output audio signal of the call to the Bluetooth earphone when the user does not place the mobile phone near the ear of the user.

2. The system of claim 1, wherein the information from the proximity sensor and the motion sensor indicates motion of the mobile phone and the mobile phone being placed within an effective answering distance of the ear of the user.

3. The system of claim 1, wherein the mobile phone is further caused to output prompt information indicating that audio signal of the call is output by the earpiece.

4. The system of claim 3, wherein the prompt information comprises textual information.

5. The system of claim 3, wherein the prompt information comprises sound information.

6. An electronic device comprising:
   a processor;
   at least one sensor coupled to the processor;
   an earpiece coupled to the processor; and
   a non-transitory computer-readable memory coupled to the processor, wherein the non-transitory computer-readable memory stores instructions that, when executed by the processor, cause the electronic device to:
   communicatively couple the electronic device to an audio output device;
   output audio signal of a call by the audio output device after the call is answered; and
   automatically switch audio signal of the call from being output by the audio output device to being output by the earpiece of the electronic device based on information from the at least one sensor when a user places the electronic device near an ear of the user within a preset time after the call is answered.

7. The electronic device of claim 6, wherein the information from the at least one sensor indicates motion of the electronic device and the electronic device being placed within an effective answering distance of the ear of the user.

8. The electronic device of claim 6, wherein the electronic device comprises a mobile phone, wherein the at least one sensor comprises a proximity sensor and a motion sensor, and wherein the audio output device comprises an earphone.

9. The electronic device of claim 8, wherein the earphone comprises a wireless earphone.

10. The electronic device of claim 8, wherein the earphone comprises a Bluetooth earphone.

11. The electronic device of claim 6, wherein the electronic device is further caused to output prompt information indicating that audio signal of the call is output by the earpiece.

12. The electronic device of claim 11, wherein the prompt information comprises textual information.

13. An electronic device comprising:
    a processor; and
    a memory coupled to the processor, wherein the memory comprises instructions that, when executed by the processor, cause the electronic device to:
    communicatively couple the electronic device to an audio output device through a wireless connection;
    output audio signal of a call by the audio output device after the call is answered; and
    automatically switch audio signal of the call from being output by the audio output device to being output by an earpiece of the electronic device in a case that the electronic device is placed near an ear of a user within a preset time after the call is answered.

14. The electronic device of claim 13, wherein data from a proximity sensor is analyzed to determine whether the electronic device is placed near the ear of the user within the preset time after the call is answered.

15. The electronic device of claim 13, wherein data from a motion sensor is analyzed to determine whether the electronic device is placed near the ear of the user within the preset time after the call is answered.

16. The electronic device of claim 13, wherein data from both a proximity sensor and a motion sensor is analyzed to determine whether the electronic device is placed near the ear of the user within the preset time after the call is answered.

17. The electronic device of claim 13, wherein the electronic device is further caused to output prompt information indicating that audio signal of the call is output by the earpiece.

18. The electronic device of claim 13, wherein the electronic device comprises a mobile phone, wherein the audio output device comprises an earphone.

19. The electronic device of claim 18, wherein the wireless connection comprises a Bluetooth connection.

20. The electronic device of claim 13, wherein the preset time is two seconds.

* * * * *